(12) United States Patent
Varnhagen (10) Patent No.: US 10,752,225 B2
(45) Date of Patent: Aug. 25, 2020

(54) DETERMINING FRICTION DATA OF A TARGET VEHICLE

(71) Applicant: Ford Global Technologies, LLC, Dearborn, MI (US)

(72) Inventor: Scott Varnhagen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 410 days.

(21) Appl. No.: 15/427,328

(22) Filed: Feb. 8, 2017

(65) Prior Publication Data

US 2018/0222462 A1 Aug. 9, 2018

(51) Int. Cl.
*B60T 8/1755* (2006.01)
*B60T 8/1763* (2006.01)
*B60T 8/171* (2006.01)
*B60T 8/172* (2006.01)

(52) U.S. Cl.
CPC .......... *B60T 8/17558* (2013.01); *B60T 8/171* (2013.01); *B60T 8/172* (2013.01); *B60T 8/17557* (2013.01); *B60T 8/17636* (2013.01); *B60T 2201/08* (2013.01); *B60T 2210/12* (2013.01)

(58) Field of Classification Search
None
See application file for complete search history.

(56) References Cited

U.S. PATENT DOCUMENTS

| | | | | |
|---|---|---|---|---|
| 5,411,322 A | * | 5/1995 | Breen | B60T 8/1708 303/150 |
| 8,543,261 B2 | | 9/2013 | Anderson et al. | |
| 8,957,949 B2 | | 2/2015 | Randier et al. | |
| 9,156,447 B2 | * | 10/2015 | Zagorski | B60T 7/18 |
| 9,233,692 B2 | | 1/2016 | Zagorski | |
| 9,475,500 B2 | | 10/2016 | Grimm et al. | |
| 2012/0101713 A1 | | 4/2012 | Moshchuk et al. | |
| 2016/0176408 A1 | * | 6/2016 | Lynch | B60W 40/064 701/23 |
| 2016/0280251 A1 | | 9/2016 | George et al. | |
| 2016/0368504 A1 | * | 12/2016 | Kieren | B60W 40/068 |
| 2017/0151955 A1 | * | 6/2017 | Offenhaeuser | B60W 30/18172 |
| 2018/0126997 A1 | * | 5/2018 | Offenhaeuser | B60W 10/18 |
| 2019/0113924 A1 | * | 4/2019 | Falconer | B60W 30/18172 |
| 2019/0299997 A1 | * | 10/2019 | Schlegel | B60W 40/068 |

FOREIGN PATENT DOCUMENTS

| | | |
|---|---|---|
| DE | 102014219493 A1 | 3/2016 |
| JP | 2002225691 A * | 8/2002 |
| JP | 2002225691 A | 8/2002 |
| JP | 2004017731 A * | 1/2004 |

OTHER PUBLICATIONS

Toyoda, Hiromitsu; Machine Translation of JP-2002225691-A; Aug. 2002; espacenet.com (Year: 2002).*
GB Search Report dated Jul. 30, 2018 re GB Appl. 1801829.1.

* cited by examiner

*Primary Examiner* — David P. Merlino
(74) *Attorney, Agent, or Firm* — Frank A. MacKenzie; Bejin Bieneman PLC (57) ABSTRACT

A computer that includes a processor and memory that stores instructions executable by the processor. The instructions may include generating, at a host vehicle, a roadway friction map by: detecting a velocity change of a target vehicle; calculating friction data based on the velocity change; and storing the friction data.

12 Claims, 4 Drawing Sheets

DETERMINING FRICTION DATA OF A TARGET VEHICLE

BACKGROUND

Human drivers can learn to operate a motor vehicle more safely with experience. For example, over time a human driver may learn to predict when another vehicle is going to lose traction on a dry roadway, slide on icy or snowy roads, etc. And a defensive-driving human, based on his/her experience, may drive slower and/or compensate his/her steering input around vehicles not proceeding with caution.

DETAILED DESCRIPTION

With reference to the figures, wherein like numerals indicate like parts throughout the several views, a friction detection system 10 for a host vehicle 12 is shown. The friction detection system 10 includes a computer 14 that receives information from a number of sensors and vehicle systems and uses that information to determine friction data for one or more neighboring vehicles 16, 18, 20 (hereafter referred to as target vehicles). As will be described below, the computer 14 may be programmed to detect changes in velocity for each target vehicle, then based on the velocity change(s), calculate and store friction data associated with the respective target vehicle and a surface 22 of a roadway 24, and then further compile the friction data from the target vehicle(s) into a roadway friction map. Furthermore, as will be described below, the computer 14 may be programmed to use the friction map to predict a skid event at a target vehicle and consequently take a preventive or defensive driving action—e.g., by issuing a collision avoidance instruction so that the host vehicle 12 may avoid a potential collision or accident.

Figure 1:
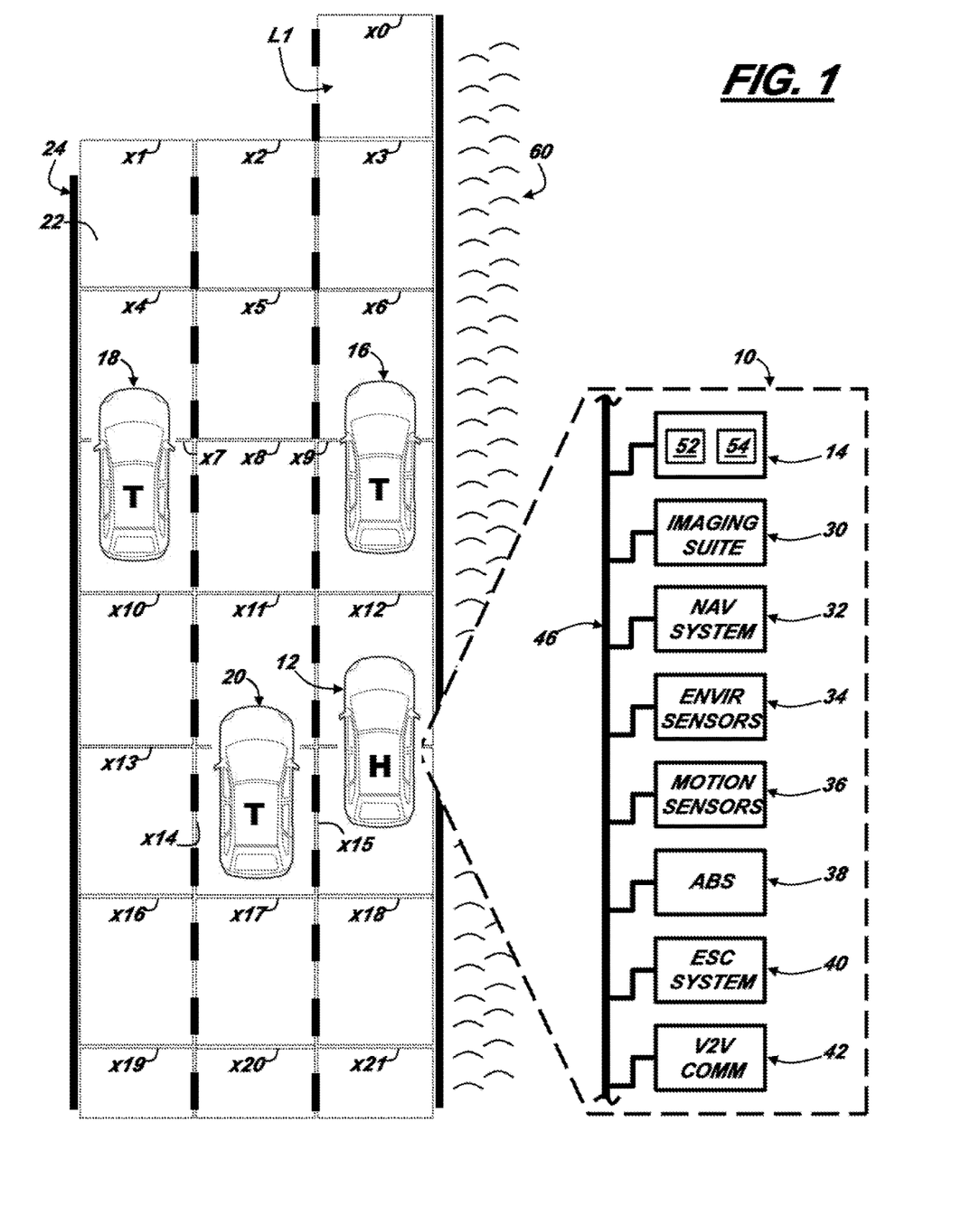
FIG. 1 is a schematic view of a host vehicle and several target vehicles on a roadway.

Referring to FIG. 1, the vehicle 12 may be a passenger car or any other suitable vehicle that includes specially-configured computer 14. For example, vehicle 12 also could be a truck, sports utility vehicle (SUV), recreational vehicle, a bus, marine vessel, aircraft, or the like that includes computer 14. In at least some examples, vehicle 12 is operable in a fully autonomous mode. As used herein, autonomous vehicle control pertains to vehicle 12 operating in an autonomous mode, as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

As shown in FIG. 1, vehicle 12 may include computer 14 communicatively coupled to a number of other computers and/or devices—including, but not limited to an imaging suite 30, a navigation system 32, environmental sensors 34, motion-detection sensors 36, an anti-lock braking system (ABS) 38, an electronic stability control (ESC) system 40, and a vehicle-to-vehicle (V2V) communication module 42. Each of these components 14, 30-42 will be described in detail below. Further, FIG. 1 illustrates that these components 14, 30-42 may communicate via any suitable wired or wireless network connection 46. In at least one example, the connection 46 includes one or more of a controller area network (CAN) bus, Ethernet, Local Interconnect Network (LIN), or the like. Other examples also exist. For example, alternatively or in combination with e.g., a CAN bus, connection 46 could comprise one or more discrete connections.

Computer 14 may be programmed to imitate observations and decision-making in an absence of an experienced human driver. For example, a so-called human defensive-driver can estimate qualitatively road friction based on prior experience, as well as the current behavior of other drivers/vehicles (e.g., such as target vehicles 16-20) on the roadway 24. Further, using his/her driving experience, the human defensive-driver may apply such estimations to predetermine practicable host vehicle trajectories—e.g., in reaction to a target vehicle losing control or behaving erratically. As will be explained below, computer 14 in host vehicle 12 may be configured to quantitatively estimate friction data associated with one or more target vehicles and similarly behave as a defensive-driver.

Computer 14 may be a single computer module (as shown) or may include multiple computing devices—e.g., shared with other vehicle systems and/or subsystems. In at least one example, computer 14 is a traction control module; however, this is merely an example. Computer 14 may comprise a processor or processing circuit 52 coupled to memory 54. For example, processor 52 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 54, which enable the computer 14, among other things, to identify a target vehicle (e.g., 16-20) based on a predetermined proximity to the host vehicle 12, detect a linear and/or angular velocity change at the respective target vehicle, calculate a friction coefficient based on that velocity change, store that friction coefficient in memory 54, generate a roadway friction map using the friction coefficient (as well as by using determined friction data of other target vehicles), update the friction coefficient based on a change in relative position between the host vehicle 12 and the respective target vehicle, update the friction coefficient based on changes in environmental conditions (e.g., weather), predict a skid event at the respective target vehicle based on the stored friction coefficient and the movement of the target vehicle, and provide a collision avoidance instruction prior to the skid event so that the host vehicle 12 may operate as or mimic a human defensive-driver.

Memory 54 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 54 may store one or more computer program products which may be embodied as software, firmware, or the like.

Imaging suite 30 can comprise one or more imaging or observation devices, one or image processing computers, software and the like. Non-limiting examples of imaging or observation devices include laser identification detection and ranging (LIDAR) devices, radio detection and ranging (RADAR) devices, and day cameras (e.g., complementary metal oxide semiconductor (CMOS) devices, charge-coupled devices (CCDs), image intensifiers (so-called i-squared devices), etc.), just to name a few examples. The imaging suite 30 may use a single imaging or observation device or any suitable combination of devices to, among other things, receive data regarding the relative position(s) of target vehicle(s) 16-20 with respect to host vehicle 12. In this manner, the imaging suite data may be used to determine whether a respective target device is changing velocity, as will be explained in greater detail below.

The navigation system 32 may comprise any suitable electronic device used to determine position data and/or heading data of the host vehicle 12. Non-limiting examples of system 32 include a Global Positioning System (GPS) unit and a Global Navigation Satellite System (GLONASS) device. As described below, the navigation system data may be used to determine relative position and distance between a target vehicle and the host vehicle 12.

Environmental sensors 34 may comprise any host vehicle sensors which provide data associated with the climate surrounding host vehicle 12. Non-limiting examples include ambient temperature sensors, precipitation sensors (e.g., detecting rain, snow, sleet, hail, etc.), and the like. Environmental sensor data should be construed broadly enough to include detection of an actuation (or use) of vehicle windshield wipers, vehicle window and/or mirror defrosters, etc. (e.g., computer 14 may receive an indication of use or actuation thereof and be programmed to make an inference including that if the wipers are used for an extended period of time, it is likely to be precipitating, or if the defrosters are being used for an extend period of time, it is likely to be colder than a predetermined threshold, etc.). Environmental sensor data may be used by computer 14 to determine or estimate changing roadway conditions—and consequently, a change in friction data.

Motion-detection sensors 36 may comprise any sensors on host vehicle 12 indicating movement of the vehicle 12. For example, sensors 36 may be used to detect and/or determine speed, velocity, acceleration, deceleration, etc. of vehicle 12. Non-limiting examples include a speedometer, one or more accelerometers, one or more gyroscopes, one or more angular-motion encoders, or the like. Motion sensor data may be used to calculate the movement of the host vehicle 12 and consequently, the relative movement of a target vehicle.

The anti-lock brake system (ABS) 38 may be any conventional ABS system that enables vehicle tires to maintain tractive contact with the roadway surface 22 while the host vehicle 12 applies a braking input which would otherwise cause the wheels to lock up and skid relative to roadway 24. Thus, ABS data may include or be used to determine friction data with respect to the host vehicle 12 and the roadway 24—e.g., using techniques known to those skilled in the art. In at least one example, this friction data may be used when the vehicle 12 moves to avoid a collision with a target vehicle (e.g., such as 16-20), as will be explained below.

The electronic stability control (ESC) system 40 may be any conventional vehicle stability control system that detects loss of vehicle steering control and which may automatically apply vehicle brakes to assist steering the vehicle 12 in a desired direction. Thus, ESC system data also may include or be used to determine friction data with respect to the host vehicle 12 and the roadway 24—e.g., using techniques known to those skilled in the art. Similarly, in at least one example, this friction data also may be used when the vehicle 12 moves to avoid a collision with a target vehicle (e.g., such as 16-20).

And the V2V communication module 42 may be any suitable telematics device configured to wirelessly communicate with other electronic devices—namely, wirelessly communicate with other vehicles (e.g., such as target vehicle 16-20). Such wireless communication may include use of cellular technology, short range wireless communication technology, or a combination thereof. Thus, for example, module 42 could utilize a Bluetooth Low Energy (BLE) protocol which is configured to receive beacon or other wireless signals from target vehicles 16-20. For example, using BLE signal data, the computer 14 may determine a relative distance between the host vehicle 12 and the respective target vehicle as well as a relative orientation of the target vehicle with respect to the host vehicle 12 (e.g., using signal strength measurement techniques, time-of-flight techniques, angle-of-arrival techniques, and the like). Of course, other techniques using BLE or other suitable wireless protocols also could be used in combination or instead.

FIG. 1 also illustrates a roadway 24 divided into a plurality of map segments (x0, x1, x2, x3, . . . x21) associated with a digital roadway friction map which is generated by processor 52 and stored in memory 54 of computer 14. Thus, the illustrated segments are representative of one example of how computer 14 may perceive a portion of roadway 24. Further, as vehicles 12, 16-20 may be moving along roadway 24, additional map segments (not shown) may be used as well.

Each of the segments x0-x21 may have any suitable size. For example, in FIG. 1, a width of a segment may equal that of a roadway lane and a longitudinal length of the segment may be equal to a vehicle wheel base (e.g., of host vehicle 12). Other size examples also exist. As will be explained below, the computer 14 may generate the roadway friction map by determining friction data for one or more of these map segments x0-x21 and storing an array of friction data or segment data in memory 54. For example, for at least some of the map segments, a data array may include corresponding friction data associated with a particular vehicle (host vehicle 12 and/or one or more target vehicles 16-20). Friction data may be determined by computer 14 based on a change in velocity while the respective vehicle traverses the respective map segment. Thus, where multiple vehicles 12, 16, 18, and/or 20 traverse a common map segment, computer 14 potentially may store friction data pertaining to each of the vehicles. Further, as the vehicles 12, 16-20 may be moving along the roadway 24, this roadway friction map may be updated repeatedly—e.g., as new portions of the roadway 24 are encountered.

Figure 3:
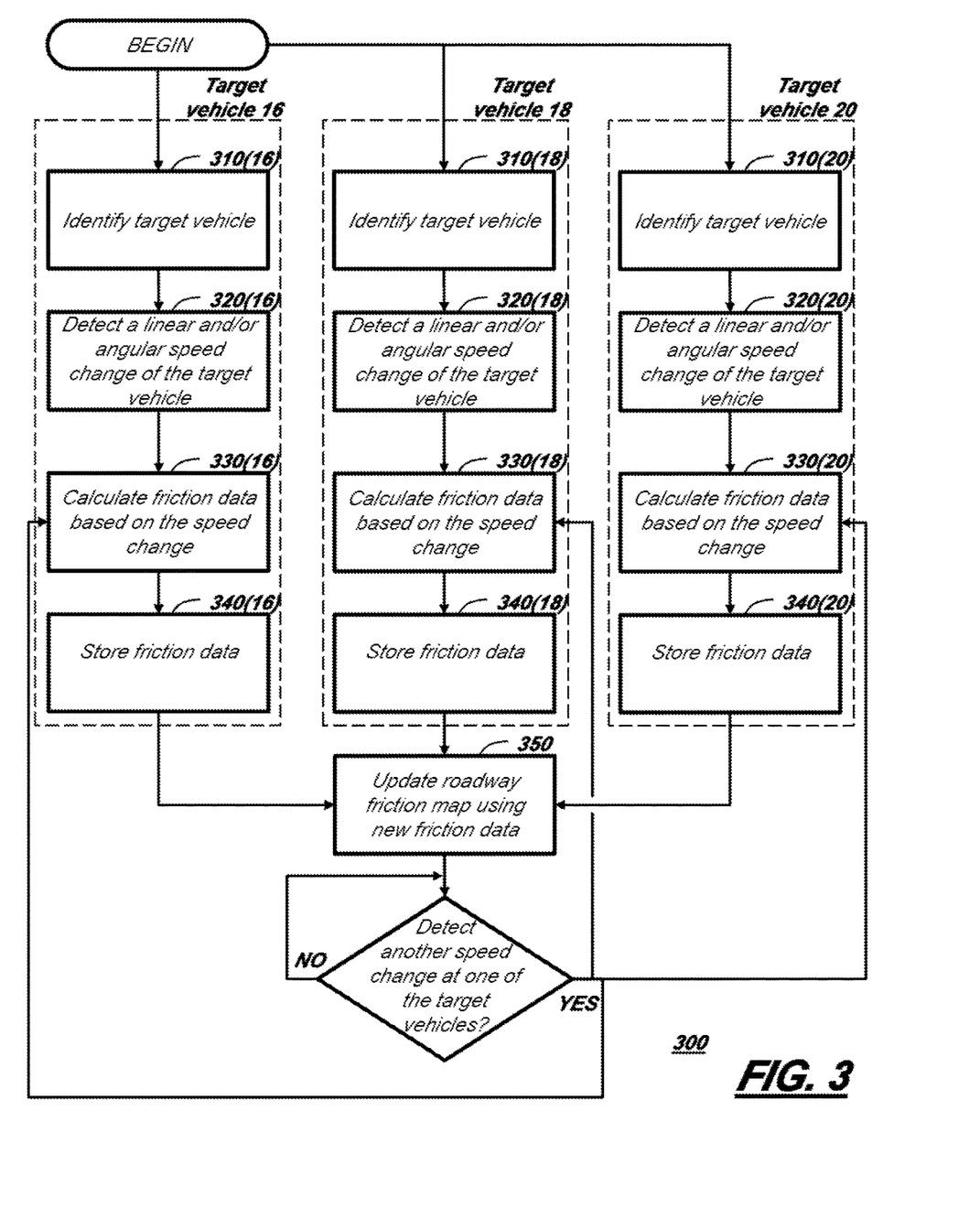
FIG. 3 is a flow diagram of a process of the host vehicle generating a roadway friction map.

Turning now to FIG. 3, a process 300 is shown for generating a roadway friction map. In block 310(16), computer 14 identifies vehicle 16 as a target vehicle—i.e., a moving vehicle located within a monitoring region of the host vehicle. The monitoring region includes any region wherein the computer 14 is generating the roadway friction map. In one non-limiting example, the monitoring region may be defined by a predetermined proximity relative to host vehicle 12 (e.g., a predefined radius around the vehicle 12). The proximity may be sized to enable host vehicle 12 in a fully autonomous mode adequate time to react to dangerous or sudden actions of other vehicles 16-20. Thus, in some example, the size of the radius may depend on the speed of the host vehicle 12 and the weight-category of host vehicle 12 (e.g., at highway speeds, a 200-foot radius may be used when the host vehicle 12 is a passenger vehicle, or a 300-foot radius may be used when the host vehicle 12 is a semi-trailer truck or the like). In some examples, the radius is larger forward of vehicle 12 than rearward thereof. Further, the monitoring region may include only roadway surfaces (e.g., such as 22)—i.e., not include non-roadway surfaces. Consequently, the monitoring region may include roadway surfaces that merge, intersect, or the like with roadway 24. Thus, for illustrative purposes in block 310(16), target vehicle 16 is within the predefined radius and is therefore identified.

In block 320(16) which follows, computer 14 may receive any suitable data from the imaging suite 30, the navigation system 32, motion sensors 36, the V2V communication module 42, or combination thereof and use that data to detect a velocity change of target vehicle 16. For example, computer 14 may detect and calculate a velocity change at target vehicle 16 when vehicle 16 accelerates or decelerates linearly along a straight section of roadway 24—or for example when target vehicle 16 maintains a constant speed along a curved section of roadway 24; or for example when target vehicle 16 maintains a constant speed along any curved path (e.g., when changing lanes on roadway 24). Of course, computer 14 could also detect and calculate a velocity change when target vehicle 16 changes speed along any curved section or path as well.

In block 330(16) which follows, computer 14 may calculate friction data based on the velocity change. As described below, in at least one example, the friction data may include a friction coefficient associated with the particular target vehicle 16 and the roadway 24 or particular roadway segment(s) (e.g., segments x6 or x9, as shown in FIG. 1). For example, the measured friction coefficient may be defined as $$\mu_{MEAS} = \frac{1}{g} * \sqrt{\left(\frac{v_x^2}{R}\right)^2 + \left(\frac{dv_x}{dt}\right)^2},$$

wherein $v_x$ is a longitudinal velocity of the target vehicle (i.e., longitudinal pertaining to a fore-aft orientation of target vehicle 16 and the direction the vehicle 16 moves along a straight path), wherein g is a gravitational acceleration constant (e.g., such as 9.81 meter/second^2), and wherein R is an instantaneous radius of curvature of a path of the target vehicle. Note: when no curvature is determined or detected by computer 14, the radius R may be assumed to approach infinity ($\infty$); consequently, the measured friction coefficient may be more simply defined as $$\mu_{MEAS} = \frac{1}{g} * \frac{d}{dt} v_x.$$

Further note: lateral velocity ($v_y$) may be negligible and thus may not be calculated. Thus, in at least one example, computer 14 may ignore this value and not include it in process 300.

As discussed above, the velocity (e.g., $v_x$) may be determined using inputs from the imaging suite 30, the navigation system 32, motion-detection sensors 36, the V2V communication module 42, a combination thereof, or the like. The radius of curvature R may be determined using equipment onboard host vehicle 12 as well. For example, if the target vehicle 16 is merely following a path within a roadway lane (e.g., lane L1), then data acquired by computer 14 from the navigation system 32 may be used to determine the radius R. In other circumstances—e.g., where no navigation system data is available or when the target vehicle 16 is changing lanes on a straight section of roadway 24—the computer 14 may calculate the radius R based on imaging data or the like from imaging suite 30. Still other examples exist.

The measured friction coefficient ($\mu_{MEAS}$) may be less than a maximum friction coefficient ($\mu_{MAX}$) actually available between the target vehicle 16 and roadway 24. For example, the maximum friction coefficient ($\mu_{MAX}$) may be defined as $$\frac{F_k}{F_N},$$

wherein $F_k$ is a force of kinetic friction (or a force acting against the direction of vehicle 16 motion) and $F_N$ is a force normal to roadway 24 (e.g., based on a mass of target vehicle 16). Thus, by computer 14 calculating the measured friction coefficient ($\mu_{MEAS}$) when target vehicle 16 is not sliding, skidding, etc., computer 14 may presume that $\mu_{MEAS}$ represents a minimum available friction between the tires of target vehicle 16 and roadway 24. Conversely, computer 14 may conclude that target vehicle 16 has exceeded the available friction between its tires and the roadway 24 if data received at computer 14 from the imaging suite 30, etc. indicates that target vehicle 16 is sliding, skidding, etc. on roadway 24.

In block 330(16), computer 14 may calculate other friction data as well. And after these calculations, computer 14 may execute the instructions of block 340(16)—e.g., store the friction data in memory 54.

Then in block 350 (and as described above), the friction data may be compiled to construct and/or update the roadway friction map. For example, the calculated friction data may be stored in an array associated with a particular map segment a particular map segment. Some segments may no friction data associated therewith. Other segments may have friction data associated with one or more target vehicles.

In at least one example, process 300 carries out identical instructions for target vehicles 18 and 20. For example, blocks 310(18), 320(18), 330(18), 340(18) may be identical to blocks 310(16), 320(16), 330(16), 340(16)—except of course that blocks 310(18), 320(18), 330(18), 340(18) pertain to target vehicle 18 instead. Similarly, blocks 310(20), 320(20), 330(20), 340(20) may be identical to blocks 310(16), 320(16), 330(16), 340(16)—except of course that blocks 310(20), 320(20), 330(20), 340(20) pertain to target vehicle 20 instead. Thus, in block 350, computer 14 may construct and/or update the friction map based on multiple target vehicles (e.g., 16-20)—e.g., not just a single target vehicle. Of course, the three target vehicles 16-20 shown in FIG. 1 is only an example as well. Other quantities are possible, and may depend on the quantity of target vehicles within the monitoring region.

Following block 350, the process 300 may determine whether a subsequent velocity change at any of the target vehicles within the monitoring region has occurred (e.g., target vehicles 16-20). If no velocity change is detected, then the process may loop back and repeat block 350. However, if one or more velocity changes are detected, then process 300 may loop back to one or more of blocks 330(16), 330(18), 330(20), etc.—depending on whether the velocity change was detected at vehicle 16, vehicle 18, or vehicle 20, respectively.

In process 300, computer 14 may regenerate the friction data map based on any of the following (or any combination of the following): when a velocity change at one of the target vehicles 16-20 is detected, when computer 14 identifies a new target vehicle (e.g., other than those shown 16-20) in the monitoring region, when the relative positions of the host and target vehicles 12, 16-20 change, or when environmental conditions change. And process 300 may end when an ignition system (not shown) of host vehicle 12 is turned OFF. Process 300 does not require vehicle 12 to be moving—e.g., target vehicles 16-20 may be moving while vehicle 12 is temporarily stopped. In addition, in some examples, process 300 can include computer 14 determining friction data related to the host vehicle 12 (and corresponding map segment(s) such as x12 and x15 shown in FIG. 1). Computer 14 similarly may store this friction data in memory 54. In one example, host vehicle friction data may be used to determine a collision avoidance instruction, as described in process 400 below.

In other examples of process 300, host vehicle friction data may be determined by computer 14—e.g., using ABS data, ESC system data, or the like—and then this friction data may be compiled into the roadway friction map stored in memory 54. For example, when no data has been collected for a particular target vehicle, and computer 14 attempts to determine a collision avoidance instruction (e.g., based on the movement or driving behavior of the particular target vehicle), computer 14 may use the friction data calculated for vehicle 12 instead. Further, in at least one example, computer 14 may extrapolate or otherwise scale the particular target vehicle friction data based on a ratio of the size or estimated weight of the particular target vehicle with respect to the size or weight of the host vehicle. Host vehicle friction data also may be used in other ways as well.

Figure 4:
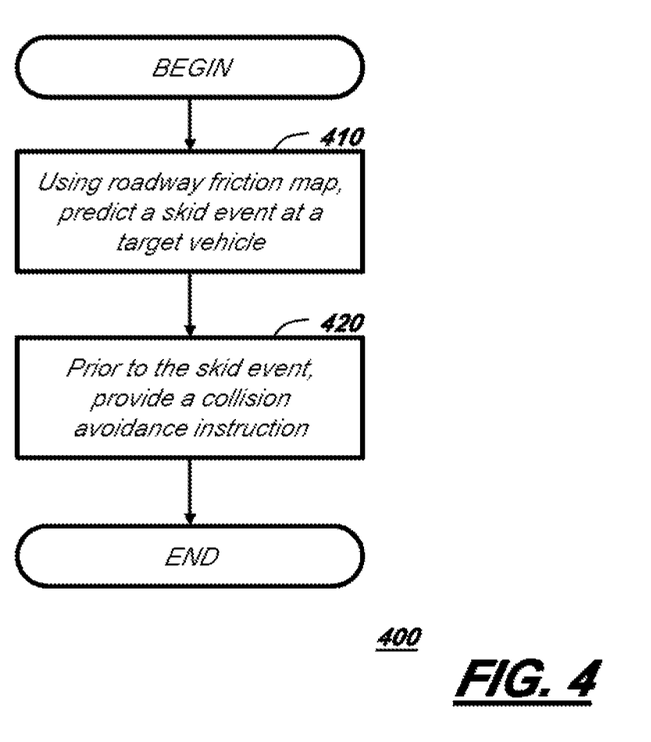
FIG. 4 is a flow diagram of a process of the host vehicle using the roadway friction map to avoid a collision.

Process 400 utilizes the roadway friction map generated (and typically updated) in process 300 in order to avoid a collision. Note, processes 300 and 400 may occur concurrently; in this manner, any collision avoidance instruction determined by computer 14 may be based on an updated roadway friction map. The process 400 may occur when the vehicle 12 is operating in a partially or fully autonomous mode; in at least one example, host vehicle 12 is in the fully autonomous mode. Process 400 begins with block 410, wherein computer 14 may predict a skid event at one of the target vehicles (e.g., vehicle 16). The possible scenarios are plentiful—thus, only a few non-limiting examples are discussed below. As used herein, a skid event is any target vehicle event wherein the tires of the target vehicle slide or skid relative to the roadway surface 22; e.g., experiencing a loss of traction control.

Computer 14 may predict target vehicle 16 will lose traction at an upcoming curve in roadway 24. This prediction may be based on computer 14 determining a current velocity of vehicle 16 (e.g., from imaging suite 30), computer 14 determining a radius of curvature R for the upcoming curve (e.g., from its navigation system 32), and a determination of the target vehicle friction data (as described above in process 300). For example, through process 300, computer 14 repeatedly may store numerous calculated friction coefficient values—for any single target vehicle (e.g., such as vehicle 16), as well as for target vehicles generally (e.g., including but not limited to vehicles 16, 18, 20). Thus, when predicting a skid event at target vehicle 16, computer 14 may parse memory 54 for the largest measured friction coefficient value (e.g., the largest $\mu_{MEAS}$) for the respective target vehicle. If the friction coefficient required to maintain traction exceeds that of the largest measured and stored friction coefficient (e.g., the largest $\mu_{MEAS}$), then the computer may determine a collision avoidance instruction, as described in block 420 below.

Figure 2:
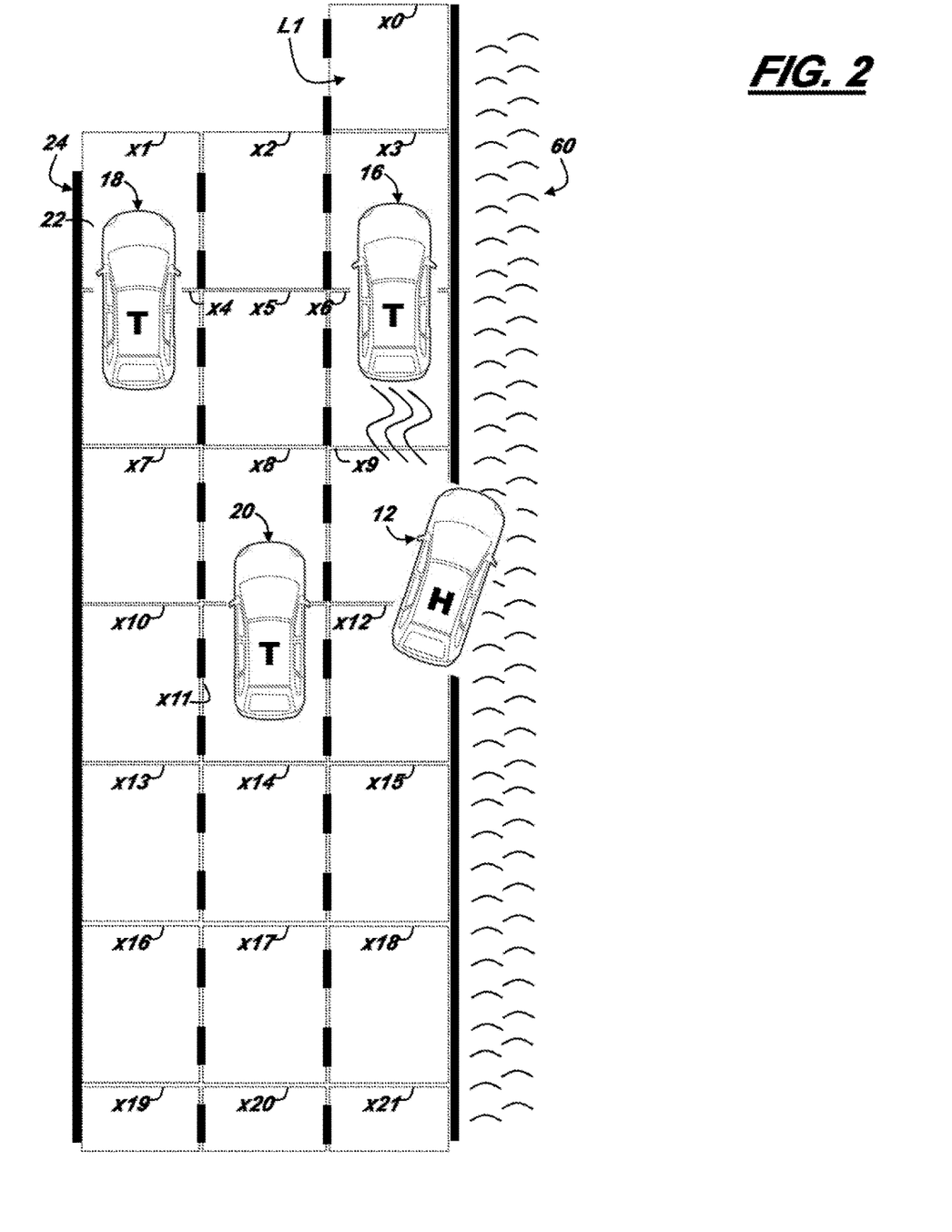
FIG. 2 is another schematic view of the roadway shown in FIG. 1, wherein the host vehicle is executing a collision avoidance instruction.

In another non-limiting example, computer 14 may determine that target vehicle 16 is rapidly decelerating (e.g., in lane L1, as shown in FIG. 1). Using the criteria described above, computer 14 may determine that the friction coefficient required to maintain traction exceeds that of the largest measured and stored friction coefficient (e.g., the largest $\mu_{MEAS}$). Consequently, computer 14 may determine a collision avoidance instruction, as described in block 420 below—e.g., even before vehicle 16 begins to skid (as shown in FIG. 2).

In another non-limiting example, computer 14 may detect a change in climate conditions based on data from sensors 34 (e.g., it may begin to rain), and this change in climate conditions may occur between new measurements and calculations of the respective target vehicle 16 friction data. Host vehicle 12 may recalculate its friction coefficient (during the rain) and compare this recalculated friction coefficient with a previously-determined host vehicle friction coefficient—i.e., one determined prior to the onset of the rain. Using these two calculations, computer 14 may determine a correction factor (e.g., a percentage of decreased roadway friction since the rain began). Thereafter, computer 14 may determine that the target vehicle 16 begins to decelerate suddenly in the rain. Without determining a new target vehicle friction coefficient (during the rain), computer 14 may apply the correction factor to the target vehicle's previously largest measured friction coefficient from memory 54 and similarly predict a skid event (e.g., even before the loss of traction occurs).

In block 420, the computer 14 outputs or provides a collision avoidance instruction so that vehicle 12 may steer (e.g., turn and/or swerve) the vehicle 12 in response to the instruction, accelerate or decelerate vehicle 12 in response to the instruction, execute any other suitable driving action in response to the instruction to avoid a collision or loss of control at vehicle 12 if and when target vehicle 16 loses traction. FIG. 2 illustrates host vehicle 12 maneuvering toward a roadway shoulder 60 to avoid a potential collision with target vehicle 16. Of course, other examples are possible. Thus, the instruction issued by computer 14 may be sent to any suitable vehicle computer module or system (e.g., a powertrain control module, a steering control module, etc.) so that the appropriate system may carry out the instruction. In at least one example, this instruction is carried out in a partially or fully autonomous mode. Following block 420, the process 400 may end.

In block 420, prior to providing the collision avoidance instruction, computer 14 may determine calculate host vehicle friction data between one or more of its tires and roadway surface 22 and then base the collision avoidance instruction at least partially on the calculated host vehicle friction data. This calculated host vehicle friction data may be determined after predicting the skid event or at any suitable time therebefore. While calculating host vehicle friction data was discussed above and will not be re-described here, it should be appreciated that this data may be used by vehicle 12 to decrease the likelihood that host vehicle 12 experiences a loss of traction control too.

Thus, there has been described a friction detection system for a host vehicle. The system includes a computer that receives data pertaining to a target vehicle from one or more computer systems, computer modules, sensors, or the like in the host vehicle. Using this data, the computer determines friction data associated with the target vehicle. In at least one example, the friction data is based on changes in target vehicle velocity. Thereafter, the computer may use the friction data to predict a skid event at the target vehicle and provide a collision avoidance instruction.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, [what the processor is supposed to do]. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and memory storing instructions executable by the processor, the instructions comprising to:
generate, at a host vehicle, a roadway friction map by:
detecting a velocity change for each of a plurality of target vehicles, wherein each of the plurality of target vehicles are within a predetermined proximity of the host vehicle;
for each of the plurality of target vehicles, calculating a minimum friction data based on the respective velocity changes; and
for each of the plurality of target vehicles, storing the minimum friction data in the roadway friction map, wherein the roadway friction map comprises a plurality of map segments within the predetermined proximity of the host vehicle;
based on a driving behavior of one of the plurality of target vehicles, determine an updated friction data for at least one of the plurality of map segments;
predict a skid event of the one of the plurality of target vehicles based on determining that the updated friction data exceeds minimum friction data previously stored in the roadway friction map; and
based on the prediction, determine a collision avoidance instruction for the host vehicle.

2. The computer of claim 1, wherein the instructions further comprise to calculate the minimum friction data by determining a measured friction coefficient ($\mu_{MEAS}$) associated with each of the plurality of target vehicles.

3. The computer of claim 2, wherein the measured friction coefficient ($\mu_{MEAS}$) is defined as $$\mu_{MEAS} = \frac{1}{g} * \sqrt{\left(\frac{v_x^2}{R}\right)^2 + \left(\frac{dv_x}{dt}\right)^2},$$

wherein $v_x$ is a longitudinal velocity of each of the plurality of target vehicles, g is a gravitational acceleration constant, and R is an instantaneous radius of curvature of a path of each of the plurality of target vehicles.

4. The computer of claim 1, wherein the instructions further comprise to, prior to determining the collision avoidance instruction, calculate a host vehicle friction data between at least one vehicle tire of the host vehicle and a roadway surface in contact therewith, and wherein the instructions further comprise to base the collision avoidance instruction at least partially on the calculated host vehicle friction data.

5. The computer of claim 4, wherein the instructions further comprise to use data from at least one of an anti-lock braking (ABS) system (ABS data) or an electronic stability control system (ESC system data) when calculating the host vehicle friction data.

6. The computer of claim 1, wherein the instructions further comprise to regenerate the roadway friction map based on changing relative positions of the host vehicle and the plurality of target vehicles, based on changing environmental conditions, or a combination thereof.

7. A method, comprising:
generating, at a host vehicle, a roadway friction map by:
detecting, for each of a plurality of target vehicles, a longitudinal velocity change, wherein each of the plurality of target vehicles are within a predetermined proximity of the host vehicle;
for each of the plurality of target vehicles, calculating a minimum friction data based on the respective longitudinal velocity change;
for each of the plurality of target vehicles, storing the minimum friction data in the roadway friction map, wherein the roadway friction map comprises a plurality of map segments within the predetermined proximity of the host vehicle; and
predicting a skid event of one of the plurality of target vehicles based on determining that an updated friction data—for at least one of the plurality of map segments—exceeds minimum friction data previously stored in the roadway friction map.

8. The method of claim 7, wherein calculating the minimum friction data includes determining a measured friction coefficient ($\mu_{MEAS}$) associated with each of the plurality of target vehicles.

9. The method of claim 8, wherein a component of the measured friction coefficient ($\mu_{MEAS}$) is defined as $$\mu_{MEAS} = \frac{1}{g} * \sqrt{\left(\frac{v_x^2}{R}\right)^2 + \left(\frac{dv_x}{dt}\right)^2},$$

wherein $v_x$ is a longitudinal velocity of each of the plurality of target vehicles, g is a gravitational acceleration constant, and R is an instantaneous radius of curvature of a path of each of the plurality of target vehicles.

10. The method of claim 7, further comprising determining a collision avoidance instruction based on the prediction.

11. The method of claim 10, further comprising: prior to determining the collision avoidance instruction, calculating a host vehicle friction data between at least one vehicle tire of the host vehicle and a roadway surface in contact therewith; and basing the collision avoidance instruction at least partially on the calculated host vehicle friction data.

12. The method of claim 7, further comprising regenerating the roadway friction map based on changing relative positions of the host vehicle and the plurality of target vehicles, based on changing environmental conditions, or a combination thereof.

* * * * *